Figure 1:
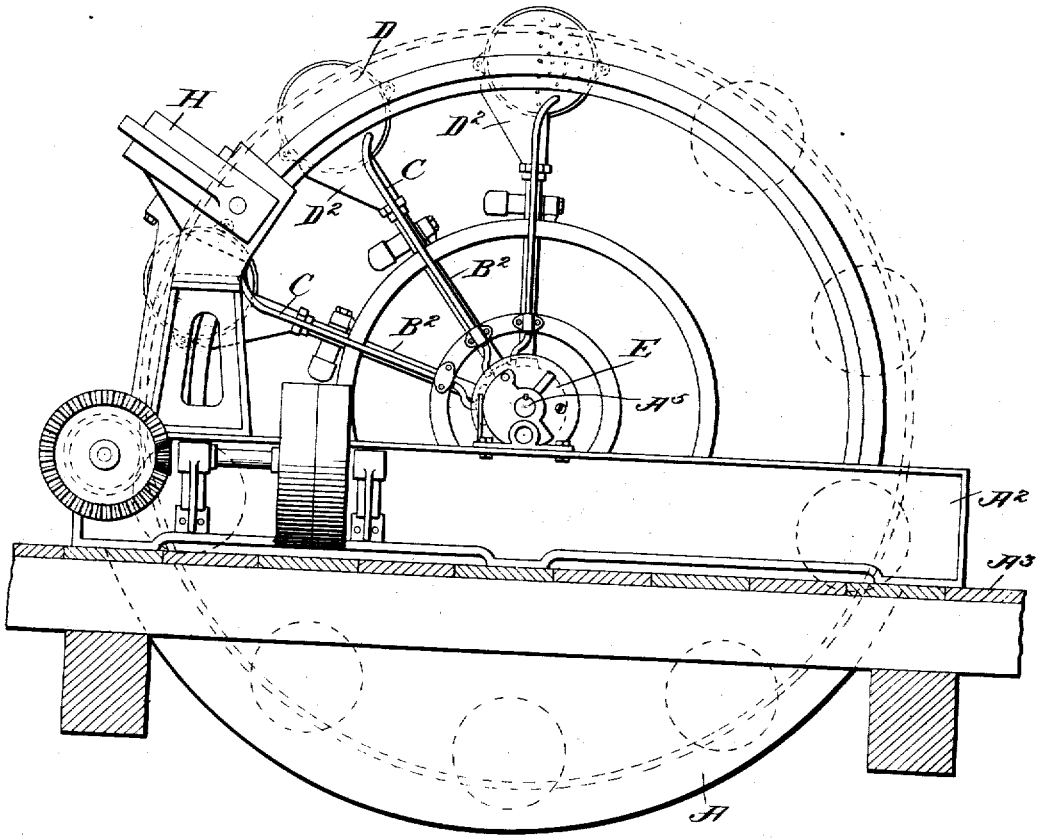

M. L. KEYES.

APPARATUS FOR MAKING PULP ARTICLES.

APPLICATION FILED DEC. 8, 1908.

12,911.

Reissued Jan. 12, 1909.

2 SHEETS—SHEET 1.

Witnesses:

Thomas J. Drummond

Joseph M. Ward.

Inventor:

Martin L. Keyes, by Crosby & Gregory

Attys.

M. L. KEYES.
APPARATUS FOR MAKING PULP ARTICLES.
APPLICATION FILED DEC. 8, 1908.
12,911.
Reissued Jan. 12, 1909.
2 SHEETS—SHEET 2.
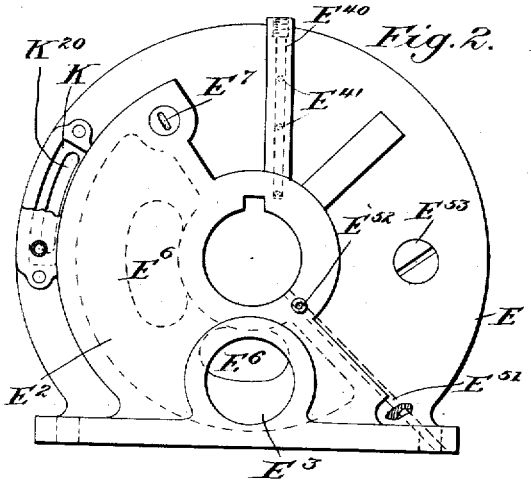
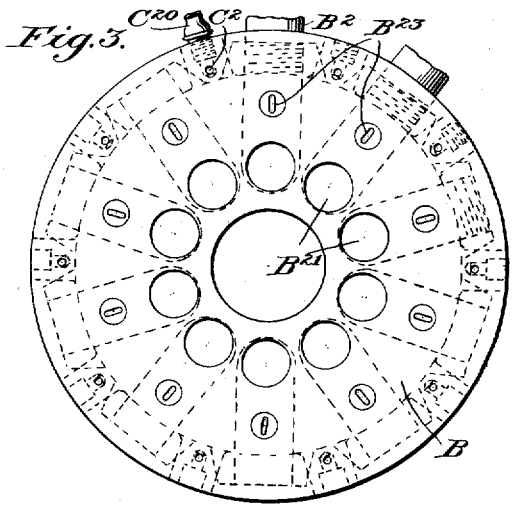
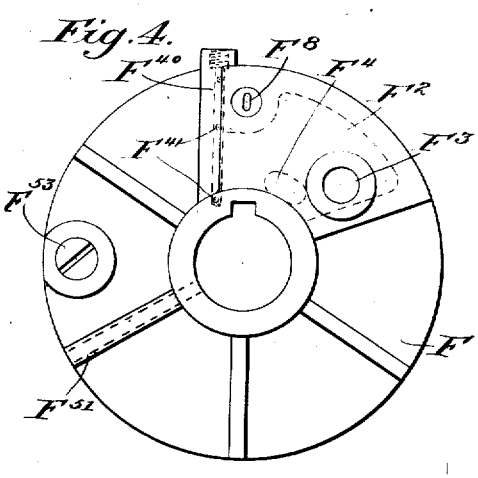
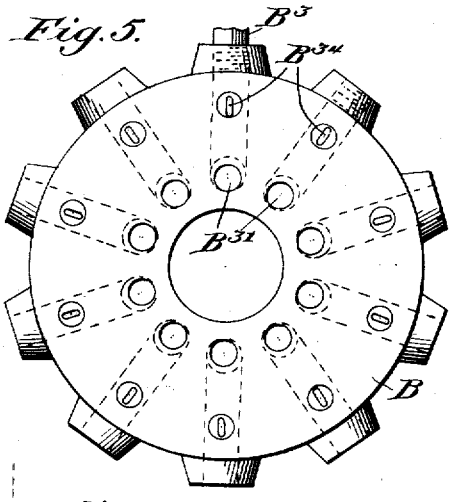
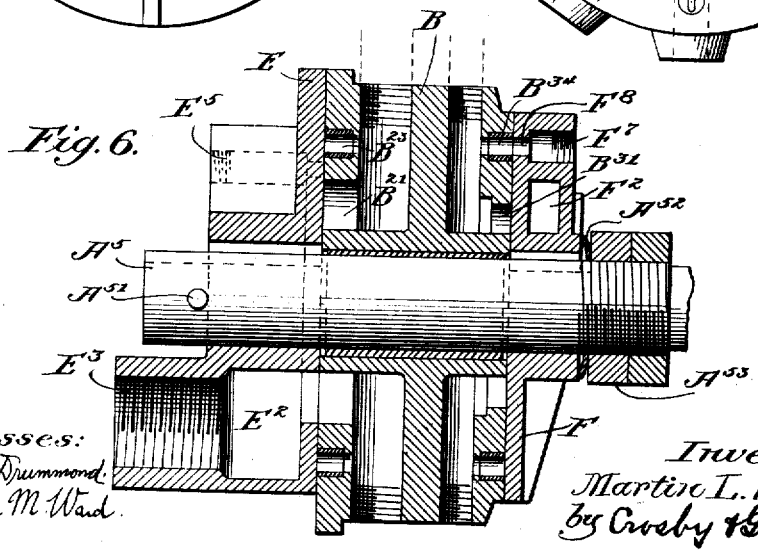
Witnesses:
Thomas J. Drummond.
Joseph M. Ward.
Inventor:
Martin L. Keyes,
by Crosby & Gregory attys.

UNITED STATES PATENT OFFICE.

MARTIN L. KEYES, OF FAIRFIELD, MAINE, ASSIGNOR TO KEYES FIBRE COMPANY, OF SHAWMUT, MAINE, A CORPORATION OF MAINE.

APPARATUS FOR MAKING PULP ARTICLES.

No. 12,911. Specification of Reissued Letters Patent. Reissued Jan. 12, 1909.

Original No. 903,869, dated November 17, 1908, Serial No. 444,690. Application for reissue filed December 8, 1908. Serial No. 467,119.

*To all whom it may concern:*

Be it known that I, MARTIN L. KEYES, a citizen of the United States, and a resident of Fairfield, in the county of Somerset and State of Maine, have invented an Improvement in Apparatus for Making Pulp Articles, of which the following description, in connection with the accompanying drawing, is a specification, like letters on the drawing representing like parts.

This invention is for an improvement upon a machine or apparatus for molding articles from pulp, such as has been made the subject of previous patents granted to me, among which I may refer to Patent No. 759,616, granted May 10, 1904, and Patent No. 788,138, granted April 25, 1905. A machine of this type comprises a mold having nesting faces between which the article is formed, a vat to contain the pulp, means to dip said mold into the pulp, means to apply suction to one face of the mold while it is immersed in the pulp, whereby a layer of pulp is deposited on said face, and means to close subsequently the faces together and compress the pulp layer into an article of the desired shape. In the particular embodiments of the invention illustrated in these patents the mold is a traveling mold and comprises a member fixed to a mold carrier and having one mold face, and another member pivoted to the mold carrier and having a second mold face. During the rotation of the carrier the fixed mold face is immersed in the body of pulp and suction is applied thereto whereby a layer of pulp is deposited thereon. During the continued movement of the mold carrier the pivoted mold member is closed against the fixed member and the layer of pulp is compressed between the mold faces. During the further movement of the mold carrier the mold faces are separated and at the same time a blast of air is forced through the face of the fixed mold member, thereby loosening the shaped article therefrom. As set forth in said Patent No. 759,616, it has been found essential that all of the water should be drained from the fixed mold member before the air is admitted to said member for blowing off the molded article, because if any water remains in said mold the blast of air will blow such water through the perforated mold face and soften the article to such a degree that it cannot be effectively handled. The said patent provided a draining chamber communicating with the interior of the fixed member, and so shaped that by the time the mold got into the position in which the members were separated that all water in the draining chamber would have a tendency to run off by gravity. The said patent also provided a valve mounted in the fixed mold member and communicating with the outer air, the said valve being open subsequent to the compressing operation and while the said mold member was still connected with the vacuum, so that the water in the said mold member and draining chamber would be swept out by the vacuum before the compressing action took place.

While the arrangement referred to has proved very efficient in removing the water from the fixed mold member, yet it has been found open to some objections. The valve mounted in the fixed mold member is carried at every cycle of movement through the vat of pulp and thus becomes more or less clogged by the pulp and frequently this pulp and other foreign matter is drawn in through the valve when it is opened. Any pulp or foreign matter thus passing into the valve is, of course, carried into the vacuum system to the injury and disarrangement thereof, or it is blown by the compressed air into the mold face or into the articles being molded to the injury of either or both. Furthermore, the valve projecting from the fixed mold member is liable to be bent or injured by contact with some exterior object during the movement of the mold member. The present invention obviates all these difficulties and secures a draft of air through the mold member without the carrying thereinto of any pulp or foreign matter. This is secured by providing a passageway in the preferred form, a separate pipe, connecting the chamber of the fixed mold member with a port in the central moving part or hub of the carrier for the mold, and by providing a chamber open to the air in the collar or other part containing the vacuum and compressed air ports, and providing a port through which communication may be made between this air chamber and the port in the hub at the desired time, viz., while the fixed mold member is still in communication with the vacuum and before the compressed air has been admitted to the fixed mold member. The central portion or hub of the mold carrier is located well above the liquid level of the pulp vat and there is no danger of pulp or other foreign substances passing into the air chamber in the collar or similar part.

Other features of the invention reside in the means for maintaining the lubrication and cleanliness of the opposing surfaces of the revolving hub and fixed collar.

The nature of the invention will more fully appear from the accompanying description and drawings and will be particularly pointed out in the claims.

The drawings illustrate so much of the apparatus of the type disclosed in the aforesaid patents as is necessary for an understanding of the invention here involved.

Figure 1 is a side elevation of the entire apparatus shown in a somewhat conventional form for the purpose of illustrating the general arrangement of the parts. Fig. 2 is a front end elevation of the collar on the shaft looking in the direction of Fig. 1. Fig. 3 is a view showing the end of the hub of the mold carrier which is toward the front in Fig. 1. Fig. 4 is an end elevation of the collar which faces against the end of the hub shown in Fig. 4. Fig. 5 is a view of the end of the hub opposite to that shown in Fig. 2. Fig. 6 is a cross-section of the hub of the mold carrier and the collars, taken on the line $x$—$x$, Fig. 1.

The apparatus shown in the drawing as an embodiment of the invention is similar to that illustrated in the above-mentioned patents, and it is therefore unnecessary to describe the same in detail.

The pulp vat is illustrated at A mounted on a suitable frame $A^2$, resting on the floor $A^3$ so that the vat may extend below the floor. The frame $A^2$ has mounted thereon at one side a supporting bracket (not shown) and at the other side the collar E in which is mounted the shaft $A^5$ keyed thereto so as to be non-rotary.

The hub B of the mold carrier is mounted to rotate freely on the shaft $A^5$, as in said Patent No. 788,138, and is provided with the radial hollow arms $B^2$, $B^3$, leading respectively to the fixed and pivoted mold members. These hollow arms open into ports on the sides of the hub, as in said patent. The ports $B^{21}$ being the vacuum ports and the ports $B^{23}$ the compressed air ports of the hollow arm $B^2$, and the ports $B^{31}$ being the vacuum ports and the ports $B^{34}$ the compressed air ports for the hollow arms $B^3$. In addition I provide a passageway, herein shown as formed of a small pipe C, entering the back of the fixed mold member D, and extending along down the hollow arm $B^2$, and terminating near the hub B, and a flexible tube $C^{20}$, extending from the end of the pipe C to a port $C^2$ opening at the face of the hub B. The chambered collars E and F are keyed to the shaft $A^5$ as shown in said Patent No. 788,138. A pin $A^{51}$ projecting through the shaft $A^5$ abuts against the face of the collar E while the other end of the shaft $A^5$ is provided with a yielding or spring washer $A^{52}$, and locking nuts $A^{53}$ threaded thereon. By this means the faces of the hub and of the opposing collars are held in intimate contact. The collar F, as in said Patent No. 788,138, is provided with a vacuum chamber $F^2$, in communication through a suitable pipe entering at $F^3$ with a vacuum apparatus, and this chamber presents at its face a port $F^4$ adapted at the proper time to communicate with the ports $B^{31}$ during the rotation of the latter. This collar F is also provided with a compression port $F^8$ communicating through a suitable pipe entering at $F^7$ with an air compressing apparatus, and adapted to come into communication at the proper time with the ports $B^{34}$ during the rotation of the latter. The collar E, as in said Patent No. 788,138, is likewise provided with a vacuum chamber $E^2$, communicating by a suitable pipe entering at $E^3$ with the vacuum apparatus, and presenting ports $E^6$, adapted to come into communication at the proper time with the ports $B^{21}$ during the rotation of the latter. The collar E is also provided with a compression port $E^7$ in communication through a suitable pipe entering at $E^5$ with an air compressing apparatus, and adapted to come into communication with the ports $B^{23}$ at the proper time during the rotation of the latter.

The mold members during their travel are compressed, as in the before-mentioned patents, by passing through a compressing device. Herein this compressing device is indicated at H, and is mounted at such an angle that its action takes place after the molds have reached a position where the water in the fixed mold member D and the draining chamber $D^2$ will tend to run off by gravity. I provide the collar E with a chamber K, open to the air and presenting a port on the face of the collar toward the hub. A pipe $K^{12}$ extends from the bottom of the chamber K to a point out of reach of the pulp spattered by the machine. The port $K^{20}$ of this chamber K is so located that the port $C^2$ will come into alinement with it when the mold reaches the position where the water in the fixed mold member and the draining chamber $D^2$ can run off by gravity, a position which in the construction illustrated is determined by the angle formed between the wall of the draining chamber and the axis of the arm $B^2$. The port $C^2$ will continue in alinement with the port $K^{20}$ until the corresponding port $B^{21}$ has nearly or quite passed out of alinement with the ports of the vacuum chamber $E^2$ and the mold has passed out from the compressor. The port $C^2$ is, of course, out of alinement with the port $K^{20}$ when the compressed air is admitted to the mold through the ports $B^{23}$ and $E^7$ coming into alinement. It will thus be seen that during the compressing action and while the vacuum is in communication with the fixed mold member D, air is admitted to the said mold member, thus causing all water therein to be swept out through the vacuum system, and that the location of the ports $C^2$ and the air chamber K is such that there is no danger of pulp or foreign matter being drawn into the mold member to be subsequently blown into the molds or the molded articles, or drawn into the vacuum system.

In order to secure the proper lubrication of the opposing surfaces of the hub and the collars E and F I provide in the collars oil-shafts $E^{40}$ and $F^{40}$ respectively, from which small transverse holes $E^{41}$, $F^{41}$, respectively, communicate with the surface of the collar. The revolving hub takes up the oil thus fed to the face of the collar and transmits it to the entire opposing surfaces. By this construction a small oil cup may be placed at the top of the oil-shaft and the oil supplied steadily and evenly without carrying in any grit or dirt. I have found in the operation of this hub that foreign matters work in between the surfaces of the hub and the surfaces of the collars, and being confined there serve to score and wear the surfaces, thus injuring the air joints which it is necessary to maintain. To prevent this and enable the escape of any such foreign matter or substances I provide in the face of each collar E and F respectively, a downwardly inclined groove $E^{51}$ and $F^{51}$ respectively. Any foreign substance being caught between the hub and the collar will be carried around until it strikes this groove and will then lodge therein and be gradually forced down the same and out of the machine. It is advisable further to wash out this groove to remove such impurities, and for that purpose I provide near the upper end a tapped hole $E^{52}$, to which hose may be connected. The ports $B^{23}$ and $B^{34}$ of the hub B are preferably formed as separate plugs of hard metal, so that they can be removed and repaired or replaced. To enable the removal of these plugs and the cleaning of the small ports therein to which the compressed air passes I provide clean-out holes $E^{53}$ and $F^{53}$ in the collars E and F respectively.

Having described my invention, what I claim as new and desire to secure by Letters Patent, is:

1. In an apparatus of the class described, a pulp containing vat, a two-part mold comprising a hollow mold member and a coöperating mold member having coöperating perforated faces, means periodically to immerse said hollow mold member in the pulp to receive a layer thereof, means automatically to exhaust the air from said member during and after its immersion, means to compress said members with the pulp layer therebetween, means to loosen the shaped article from the mold by a blast of air, an air passageway communicating with said hollow mold member and terminating at a fixed point above the liquid level of said vat, means for maintaining said passageway normally closed and for opening it during the continuance of the action of the air exhausting means, and before the admission of the air blast.

2. In an apparatus of the class described, a pulp containing vat, a two-part mold comprising a hollow mold member provided with a draining chamber, and a coöperating mold member having coöperating perforated faces, means periodically to immerse said hollow mold member in the pulp to receive a layer thereof, means automatically to exhaust the air from said member during and after its immersion, means to compress said members with the pulp layer therebetween, means to loosen the shaped article from the mold by a blast of air, an air passageway communicating with said draining chamber and terminating at a fixed point exterior to said vat, means for maintaining said passageway normally closed and for opening it during the continuance of the action of the air-exhausting means, and before the admission of the air blast.

3. In an apparatus of the class described, a pulp containing vat, a revolving mold carrier comprising a hub having a series of radially-arranged arms extended therefrom, each arm having fixed thereto a hollow mold member provided with a perforated face, the said hub presenting three series of ports in communication with said hollow mold members, a coöperating mold member for each of said hollow mold members, a fixed collar presenting a compressed air port, a vacuum port and an open-air port, means whereby as the mold carrier rotates the hollow mold members are successively immersed in the pulp and one of said series of ports are simultaneously brought into register with the vacuum port, subsequently and before the passing out of register of the first series with the vacuum port the second series of ports are brought into register with the open-air port, and then after the passing out of register of the first series with the vacuum port and of the second series with the open-air port the third series of ports are brought into register with the compressed air port, and means for compressing the two mold members together subsequent to the immersion of the first mold member in the vat and before the registration of the third series of ports with the compressed air port.

4. In an apparatus of the class described, a pulp containing vat, a two-part traveling mold comprising a hollow mold member provided with a draining chamber, a coöperating mold member having coöperating perforated faces, means periodically to immerse such hollow mold member in the pulp, means automatically to exhaust the air from said member during and after its immersion, means to compress said members with the pulp layer therebetween, means to loosen the shaped article from the mold by a blast of air, an air passageway communicating with said drawing chamber and terminating in a port, a port in a fixed portion of the apparatus in the path of travel of the first port and opening to the atmosphere, means for maintaining said ports out of register and said passageway normally closed and for bringing said ports into register and opening said passageway during the continuance of the action of the air exhausting means and before the admission of the air blast.

5. In an apparatus of the class described, a pulp containing vat, a revolving mold carrier comprising a hub having a series of radially-arranged hollow arms extended therefrom, each arm having fixed thereto a hollow mold member provided with a perforated face, a coöperating mold member for each of said hollow mold members, three series of ports on the face of said hub the first and second series being in communication with said hollow arms, and the third series being severally connected by pipes with the hollow mold members, a fixed collar mounted with its face against the face of the hub and provided with a vacuum chamber having a port in the path of the first series of ports, also with a compressed air port in line with the path of the second series of ports, and also with an open air port in line with the path of the third series of ports, means for maintaining a vacuum in said vacuum chamber, and means for supplying compressed air to said compressed air port, means whereby as the mold carrier rotates the hollow mold members are successively immersed in the pulp and the corresponding members of the first series of ports are simultaneously brought into register with the port of the vacuum chamber, and before the passing out of register of the first series of ports the corresponding members of the second series of ports are brought into register with the open-air port, and thereupon after the passing out of register of the first series with the port of the vacuum chamber and the second series with the open-air port the members of the third series of ports are brought into register with the compressed air port, and means for compressing the two mold members together subsequent to the immersion of the first mold member in the vat and before the registration of the third series of ports.

6. In an apparatus of the class described, a fixed shaft, a hub freely revoluble thereon and presenting oppositely-disposed flat faces, ports in the faces of said hubs adapted to connect with the mold members to be carried by said hub, a pair of collars one mounted at each side of the said hub and provided with flat faces coöperating with the faces of the hub, means for preventing the rotation of the collars with respect to the shaft, means for yieldingly pressing the collars and hub together.

7. In an apparatus of the class described, a fixed shaft, a hub freely revoluble thereon and presenting oppositely-disposed flat faces, ports in the faces of said hubs adapted to connect with the mold members to be carried by said hub, a pair of collars one mounted at each side of the said hub and provided with flat faces coöperating with the faces of the hub, means for preventing the rotation of the collars with respect to the shaft, an inclined groove formed in the face of each of said collars adapted to catch any foreign substance caught between the surfaces of the collar and the hub and direct it out from between said surfaces.

8. In an apparatus of the class described, a fixed shaft, a hub freely revoluble thereon and presenting oppositely-disposed flat faces, ports in the faces of said hubs adapted to connect with the mold members to be carried by said hub, a pair of collars one mounted at each side of the said hub and provided with flat faces coöperating with the faces of the hub, means for preventing the rotation of the collars with respect to the shaft, a vertically-arranged oil shaft in said collar, oil holes communicating from said shaft to the surface of said collar for lubricating the opposing surfaces of said collar and hub.

9. In an apparatus of the class described, a rotary hub, connections in the periphery thereof adapted to receive a series of hollow mold carrying arms, a second series of connections in the periphery thereof located respectively between the members of the first series of connections and adapted to receive a pipe for transmitting air to the hollow mold members, three series of ports on the face of said hub, two of the said series being in communication with the connections to the hollow arms, and one of said series being in communication with the connections for the air pipes.

10. In an apparatus of the class described, a rotary hub, a series of radially-arranged passages therein adapted to be connected to the hollow mold supporting arms, a series of plugs of hard metal each provided with a port located in said hub one for each of said chambers and inserted and removable from the face of the hub, a fixed collar having its face fitting against the face of the hub, a compressed air port in said collar located in the path of travel of the said plugs, a clean-out hole in said collar located in the path of travel of said plugs, and means for closing said clean-out hole.

In testimony whereof, I have signed my name to this specification, in the presence of two subscribing witnesses.

MARTIN L. KEYES.

Witnesses:
MABEL PARTELOW,
THOMAS J. DRUMMOND.

Corrections in Reissue Letters Patent No. 12,911.

It is hereby certified that in Reissue Letters Patent No. 12,911, granted January 12, 1909, upon the application of Martin L. Keyes, of Fairfield, Maine, for an improvement in "Apparatus for Making Pulp Articles," errors appear in the printed specification requiring correction, as follows: In line 23, page 3, after the word "hub," the reference letter *B* should be inserted, and in line 19, page 4, the word "drawing" should read *draining;* and that the said Letters Patent should be read with these corrections therein that the same may conform to the record of the case in the Patent Office.

Signed and sealed this 9th day of February, A. D., 1909.

[SEAL.]

C. C. BILLINGS,

*Acting Commissioner of Patents.*